US012056959B2

(12) United States Patent
Bremer

(10) Patent No.: US 12,056,959 B2
(45) Date of Patent: Aug. 6, 2024

(54) DEVICE FOR DISPLAYING THE ARRIVAL TIME OF A VEHICLE

(71) Applicant: Bayerische Motoren Werke Aktiengesellschaft, Munich (DE)

(72) Inventor: Steffen Bremer, Dingolfing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/785,491

(22) PCT Filed: Dec. 17, 2020

(86) PCT No.: PCT/EP2020/086661
§ 371 (c)(1),
(2) Date: Jun. 15, 2022

(87) PCT Pub. No.: WO2021/148205
PCT Pub. Date: Jul. 29, 2021

(65) Prior Publication Data

US 2023/0027246 A1 Jan. 26, 2023

(30) Foreign Application Priority Data

Jan. 22, 2020 (DE) ..................... 10 2020 101 488.0

(51) Int. Cl.
*G07C 1/30* (2006.01)
*G08G 1/133* (2006.01)

(52) U.S. Cl.
CPC ............... *G07C 1/30* (2013.01); *G08G 1/133* (2013.01)

(58) Field of Classification Search
None
See application file for complete search history.

(56) References Cited

U.S. PATENT DOCUMENTS 9,102,330 B2 * 8/2015 Beaurepaire .......... B60W 30/06
9,482,538 B1 * 11/2016 Pathangay ............... G08G 1/02
10,019,904 B1 * 7/2018 Chan .................. G06Q 10/0635
(Continued)

FOREIGN PATENT DOCUMENTS

CN 110262548 B * 10/2020
DE 10 2007 030 259 A1 1/2009
(Continued)

OTHER PUBLICATIONS

International Search Report (PCT/ISA/210) issued in PCT Application No. PCT/EP2020/086661 dated Apr. 7, 2021 with English translation (five (5) pages).
(Continued)

*Primary Examiner* — Fekadeselassie Girma
(74) *Attorney, Agent, or Firm* — Crowell & Moring LLP

(57) ABSTRACT

A device and method for displaying the arrival time of a vehicle, in particular a motor vehicle, are provided. The device includes: at least one display device which is designed to show a display, in particular a time display; a detection device which is designed to detect a parked position of the vehicle and/or that the vehicle has stopped, and output corresponding signals; and a computing unit which is communicatively connected to the detection device and the display device and which is designed to output the display on the display device while taking into consideration the signals.

16 Claims, 2 Drawing Sheets

(56) References Cited

U.S. PATENT DOCUMENTS

| | | | | |
|---|---|---|---|---|
| 10,386,845 | B1 * | 8/2019 | Konrardy | B60W 60/0023 |
| 10,467,894 | B2 * | 11/2019 | Neumayer | G08B 7/066 |
| 2010/0007523 | A1 | 1/2010 | Hatav | |
| 2010/0198498 | A1 * | 8/2010 | Jansen | G01C 21/26 701/533 |
| 2012/0062395 | A1 | 3/2012 | Sonnabend et al. | |
| 2013/0143536 | A1 * | 6/2013 | Ratti | G08G 1/147 455/414.1 |
| 2016/0055729 | A1 * | 2/2016 | Maddox | G08B 13/1481 340/572.1 |
| 2019/0083715 | A1 * | 3/2019 | Redmond | A61M 5/31553 |
| 2019/0283686 | A1 | 9/2019 | Gussen et al. | |
| 2020/0110165 | A1 * | 4/2020 | Sahin | G01S 13/878 |
| 2021/0287541 | A1 * | 9/2021 | Cajias | G01C 21/3407 |

FOREIGN PATENT DOCUMENTS

| | | | | |
|---|---|---|---|---|
| DE | 10 2010 003 890 | A1 | 10/2011 | |
| DE | 10 2011 105 832 | A1 | 11/2012 | |
| DE | 10 2013 015 704 | A1 | 3/2015 | |
| DE | 10 2014 009 639 | A1 | 12/2015 | |
| DE | 102014009639 | A1 * | 12/2015 | G07B 15/063 |
| DE | 102016001191 | A1 * | 8/2016 | |
| DE | 10 2015 207 648 | A1 | 10/2016 | |
| DE | 10 2018 203 857 | A1 | 9/2019 | |
| EP | 1231572 | A2 * | 8/2002 | G07C 1/30 |
| GB | 2575067 | A | 1/2020 | |
| WO | WO-2010131059 | A1 * | 11/2010 | G07C 1/30 |

OTHER PUBLICATIONS

German-language Written Opinion (PCT/ISA/237) issued in PCT Application No. PCT/EP2020/086661 dated Apr. 7, 2021 (six (6) pages).

German-language Search Report issued in German Application No. 10 2020 101 488.0 dated Nov. 24, 2020 with partial English translation (10 pages).

* cited by examiner

DEVICE FOR DISPLAYING THE ARRIVAL TIME OF A VEHICLE

BACKGROUND AND SUMMARY

The invention relates to a device for displaying the arrival time of a vehicle, and to a corresponding method and a vehicle.

Vehicles, in particular motor vehicles, are frequently parked in parking spaces, or in parking zones. A permitted parking period for the vehicle in a parking space or in a parking zone may have a time restriction. Depending on the parking space or parking zone, it may therefore be prescribed that a driver of the vehicle must set a parking disk and place it visibly in his vehicle. The parking disk signals a time of arrival of the vehicle in order to indicate when the parking time starts. The parking disk is set manually by the driver when the vehicle arrives and is left visible in the vehicle interior. In certain situations, there is the possibility of a driver forgetting to set a parking disk or not leaving the parking disk easily visible (from outside the vehicle) in the vehicle. An offense such as this may result in a ticket. It is likewise possible that the vehicle will then be removed, for example towed away, at the owner's expense. That is to say that if the driver forgets to set the parking disk (correctly), high costs may be incurred for the driver or vehicle keeper on account of a fine or an on-the-spot fine. Additionally, if the vehicle is towed away, owing to a parking disk not having been set (correctly), the driver may temporarily have his mobility reduced.

The invention is therefore based on the object of providing a device for displaying the arrival time of a vehicle, and a corresponding method and a vehicle, that allows the arrival time of the vehicle to always be shown correctly and in an easily visible manner, in order to avoid fines and/or additional effort for the driver and thus to save costs for the driver or vehicle keeper of the vehicle.

In particular, the object is achieved by way of a device for displaying the arrival time of a vehicle, in particular a motor vehicle, the device comprising the following:

- at least one readout apparatus, which is designed to display a readout, in particular a time readout;
- a detection apparatus, which is designed to detect a parking position and/or parking of the vehicle, and to output corresponding signals;
- a computing unit, which is communicatively connected to the detection apparatus and the readout apparatus, and which is designed to output the readout on the readout apparatus while taking into consideration the signals.

An essential concept of the invention is that, at the start of parking, a vehicle always displays an arrival time readout that is easily discernible from outside the vehicle should the location at which the vehicle is parked require this by way of a parking disk obligation. The device identifies or detects a parking disk obligation of a parking space or parking zone by way of the detection apparatus and, if necessary, may output a corresponding time readout, which signals a start of parking, in accordance with the regulations of the parking zone, independently of action by the driver.

In one embodiment, the detection apparatus comprises a position determination module, in particular a GPS module, which is designed to determine the parking position of the vehicle in order to output the readout on the readout apparatus while taking into consideration the parking position of the vehicle.

This allows the readout to be output in light of location-dependent information. This may be accomplished for example by performing a comparison against map information of a navigation system of the vehicle and/or the computing unit. As such, it is possible to identify whether the vehicle is in a parking space or in a parking zone in which it is necessary to set a parking disk. Furthermore, it is possible to obtain a current clock time by way of the position determination module, in particular by way of the GPS module of the vehicle. The effect achieved thereby is that the driver neither needs to read and/or know a current clock time, nor does the driver need to recognize that the parking space or the parking zone is an area in which it is necessary to set a parking disk.

In one embodiment, the detection apparatus comprises at least one acceleration sensor, which is designed to detect the parking of the vehicle in the parking position in order to output the readout on the readout apparatus in light of the parking of the vehicle.

This allows the device to detect movements, in particular specific movements such as stopping and/or starting, by means of the acceleration sensor. The detected movements may be taken as a basis for outputting the readout on the readout apparatus. Additionally, it is possible to detect from the movement of the vehicle that the vehicle is leaving a parking position again. This can ensure that the computing unit prompts deactivation of the readout. In this manner, the driver does not need to set the readout by hand and/or manually after stopping the vehicle. This affords the driver added value both in terms of convenience and in terms of time saved, and possibly saves incurred fines.

In one embodiment, the device comprises a communication apparatus, which is communicatively connected to the computing unit, and which is designed to interchange data with at least one remote apparatus.

This allows the readout to be output in light of current information regarding a parking zone from a remote apparatus. The information and/or the map material of the navigation system thus do not need to be stored (exclusively) locally on the computing unit, but rather may be transmitted to the communication apparatus of the vehicle from the remote apparatus, in particular a cloud. As such, current and/or updated information regarding the parking zones and the regulations of the parking zones may always be provided.

In one embodiment, a/the communication apparatus and/or the computing unit is further designed to receive parking information data from the remote apparatus, the parking information data including information regarding a parking time limit and/or a parking disk obligation at the parking position of the vehicle, in order to output the readout on the readout apparatus in light of the parking time limit and/or the parking disk obligation of the parking position of the vehicle This allows the readout on the readout apparatus to be matched to the regulations of the parking zone or of the parking space that are prescribed in situ. Depending on the parking zone, there may be different (local and/or country-specific) regulations that may be transmitted by way of the parking information data. By way of example, there may be a requirement for (depending on legislation in situ) a notification of an arrival time that rounds a current clock time of the start of parking to the nearest half-hour. Such information may be included in the parking information data. Moreover, it is possible that the communication apparatus takes the received prescribed parking time limit of the parking zone as a basis for informing the driver, for example before he gets out of the vehicle, about the time at which the parking time limit expires. In one embodiment, this may be performed by way of an information output from an information system of the vehicle, for example by way of a voice output and/or a notification in the vehicle.

In one embodiment, a/the communication apparatus and/or the computing unit is further designed to wirelessly convey a warning about the parking time limit being reached to a user terminal.

This allows a driver or vehicle keeper to be warned in good time before a parking limit expires. To this end, the communication apparatus may convey a warning to a smartphone, for example. The driver or vehicle keeper is thus provided with the opportunity to return to his vehicle in good time in order to avoid a fine or an on-the-spot fine, as a result of exceeding the parking time limit.

In one embodiment, the readout has a height of at least 2 cm, preferably at least 3 cm, more preferably at least 4 cm.

This allows the readout to be in a form that is easily visible or easily readable from outside the vehicle. Furthermore, it is possible for the size or the height of the readout to be adapted on the basis of the received parking information data, for example because a parking zone or a (locally legally prescribed) regulation prescribes a certain minimum size for the readout.

In one embodiment, the device comprises an input apparatus for activating and/or deactivating output of the readout.

This allows the driver of the vehicle to manually activate or deactivate the readout should the driver deem this necessary.

In one embodiment, the readout apparatus comprises a display and/or a projector for showing the readout.

This allows the readout to be displayed through a windshield and/or on a windshield of the vehicle in a manner that is clearly visible from outside the vehicle. Both a color display and/or a monochrome display may be produced in this case. Moreover, such a display affords great variety for configuration options. In addition to the display of an arrival time, a text box and/or at least one graphical symbol may be shown in the readout, for example. Such configuration options for output of the readout on the readout apparatus may be provided for example in light of the received parking information data and/or configured by the driver or vehicle keeper using a system of the computing unit that is provided for this purpose.

In particular, the object according to the invention is also achieved by way of a vehicle, in particular a motor vehicle, having an integrated device for displaying the arrival time, in particular as described previously, wherein the vehicle comprises a readout apparatus, which is arranged in a dashboard of the vehicle, the readout apparatus being oriented in the dashboard in such a way that a readout is discernible outside the vehicle, preferably on and/or through a windshield of the vehicle.

This results in the same advantages as have already been described in connection with the device for displaying an arrival time of a vehicle. Additionally, the arrangement of the device in the dashboard of the vehicle allows the arrival readout and thus the start of a parking period of the vehicle in a parking space and/or in a parking zone to always be displayed in the same position and/or correctly. This allows the start of a parking period to always be easily discernible from outside the vehicle and thus to always correspond to the (legal) regulations of the parking zone. The driver therefore does not need to think about setting a parking disk. This saves time and possibly costs due to a parking period being exceeded.

In particular, the object according to the invention is also achieved by way of a method for displaying an arrival time of a vehicle, in particular a motor vehicle, the method comprising the following steps:

- detecting a parking position of the vehicle, preferably by means of a detection apparatus of the vehicle, comprising a position determination module and/or an acceleration sensor;
- outputting a readout on a readout apparatus, which is preferably arranged in a dashboard of the vehicle, the readout being discernible outside the vehicle, preferably on and/or through a windshield of the vehicle, in light of parking and/or a parking position of the vehicle.

This results in the same advantages as have already been described in connection with the device for displaying an arrival time of a vehicle or the system for displaying an arrival time of a vehicle.

In one embodiment, the method comprises a step of

- reception of parking information data from a remote apparatus by means of a communication apparatus of the vehicle, the parking information data including information regarding a parking time limit and/or a parking disk obligation at the position of the vehicle, and of
- adaptation of the shown readout on the readout apparatus in light of the parking time limit and/or the parking disk obligation of the position.

In one embodiment, the method comprises a step of wireless conveyance of a warning about the parking time limit being reached to a user terminal by way of the communication apparatus of the vehicle.

This also results in the same advantages as have already been described in connection with the device for displaying an arrival time of a vehicle or the system for displaying an arrival time of a vehicle.

In one embodiment, the wireless conveyance of the warning to a user terminal takes place preferably 15 min, more preferably 20 min, still more preferably 30 min, before the parking time limit is reached and/or the wireless conveyance of the warning to a user terminal takes place on reception of a request signal, the request signal being sent to the communication apparatus of the vehicle by way of the user terminal.

This allows a driver or vehicle keeper to be informed by way of the user terminal, for example a smartphone, in good time before a parking time limit expires and possibly to have enough time to get to the parked vehicle before the parking time limit expires. Alternatively or additionally, the driver or vehicle keeper may use his user terminal, for example a smartphone, to query a length of time before the vehicle limit expires. This allows the driver or vehicle keeper to protect himself against possibly incurred costs due to a parking period being exceeded.

In particular, the object according to the invention is also achieved by way of a computer-readable storage medium, which includes instructions that cause at least one computing unit, in particular an onboard computer of a vehicle, to implement a method as described previously.

This results in the same advantages as have already been described in connection with the device for displaying an arrival time of a vehicle or the system for displaying an arrival time of a vehicle or the method for displaying an arrival time of a vehicle.

Further advantageous embodiments emerge on the basis of the dependent claims.

Further features and advantages of the invention are also described below on the basis of exemplary embodiments, which are explained in more detail on the basis of the figures.

DETAILED DESCRIPTION OF THE DRAWINGS

Figure 1:
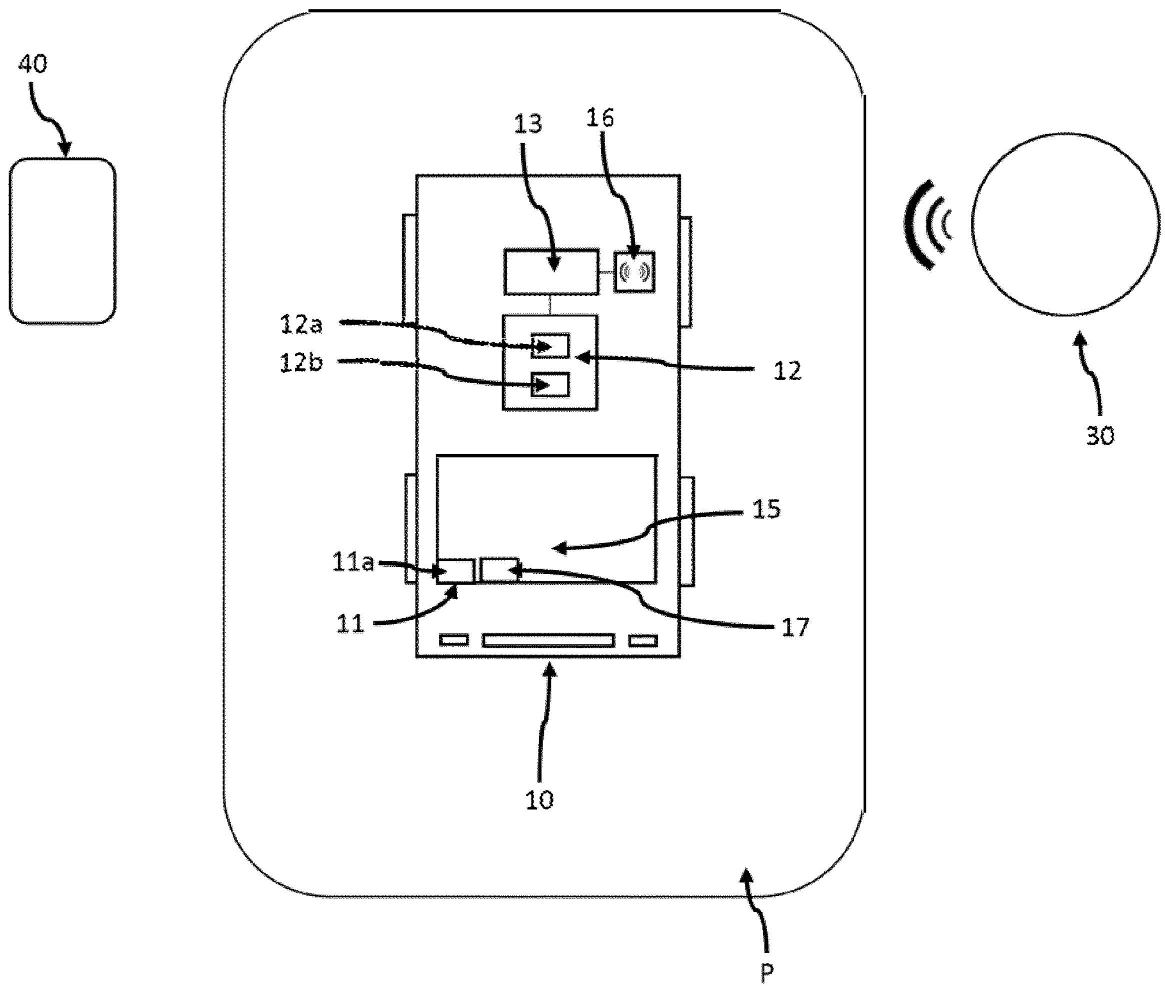
FIG. 1 is a schematic plan view of a vehicle having a device for displaying an arrival time according to an embodiment of the invention.

FIG. 1 schematically shows a plan view of an exemplary embodiment of a vehicle 10 having a device for displaying an arrival time.

In one exemplary embodiment, the vehicle 10 comprises at least one readout apparatus 11. This readout apparatus may comprise for example a display and/or a projector, with the result that a readout 11*a* is discernible from outside the vehicle 10 on a windshield 15 and/or through the windshield 15.

In one exemplary embodiment, the projector may be in the form of a projector of a head-up display of the vehicle.

In one exemplary embodiment, the readout 11*a* displays a time, which reflects a time of the start of parking of the vehicle 10 in a parking space or a parking zone P.

In one exemplary embodiment, the displayed time of the start of parking on the readout 11*a* may differ from the actual, current clock time, since it may be necessary (depending on regulations of the parking zone P) to round the displayed clock time to the nearest half-hour, for example. According to the invention, depending on (local and/or country-specific) regulations of the parking zone P, rounding that differs from the rounding described previously may also take place or the actual, current clock time at the start of parking may be output on the readout 11*a*.

The vehicle 10 further comprises a detection apparatus 12, which is designed to detect a local, or nearby, parking position and/or to detect parking of the vehicle 10 in a parking space or a parking zone P, and to output corresponding signals.

The vehicle 10 additionally comprises a computing unit 13, which is communicatively connected to the detection apparatus 12 and the readout apparatus 11, and which is designed to output the readout 11*a* on the readout apparatus 11 based on the signals.

In one exemplary embodiment, a communicative connection may comprise for example a BUS system, such as a FlexRay and/or a CAN BUS and/or an Ethernet connection.

The detection apparatus 12 comprises a position determination module 12*a*. In one exemplary embodiment, the position determination module 12*a* is in the form of a GPS module of the vehicle 10. The position determination module 12*a* may comprise a navigation system of the vehicle 10.

In one exemplary embodiment, the computing unit 13 may be formed by at least one onboard computer. This onboard computer may store map material for the navigation system of the vehicle.

The position determination module 12*a* is designed to determine the parking position of the vehicle 10, for example by locating the vehicle 10 and/or determining the GPS coordinates thereof, and to output corresponding signals regarding the position of the vehicle 10 to the computing unit 13.

In this way, the readout 11*a* may be output on the readout apparatus 11 while taking into consideration the parking position or the GPS coordinates of the vehicle 10, in particular with comparison against the map material.

In this manner, the position determination module 12*a* and/or the computing unit 13 may identify whether the parking space or the parking zone P is a parking zone P with a parking disk obligation. In one exemplary embodiment, output of the readout 11*a* may be activated and/or deactivated for example by way of a position determination using the position determination module 12*a*.

The detection apparatus 12 comprises at least one acceleration sensor 12*b*, which is designed to detect the parking of the vehicle 10 by way of a corresponding (specific) change of movement of the vehicle 10 in its parking position and to output corresponding signals regarding the change of movement to the computing unit 13.

The acceleration sensor 12*b* may acquire data regarding parking or stopping and/or starting of the vehicle 10, the readout 11*a* being output on the readout apparatus 11 in consideration of these data acquired by the acceleration sensor 12*b*. In one exemplary embodiment, output of the readout 11*a* may be activated by stopping the vehicle 10 and/or deactivated by starting the vehicle 10, for example.

Alternatively or additionally, it is possible for the detection apparatus 12 to comprise at least one pressure sensor, which is arranged in a driver's seat of the vehicle 10. In this manner, the pressure sensor may be used to ascertain a pressure in the driver's seat. This pressure in the driver's seat is an indicator of whether the driver gets out of the vehicle 10 (as a result of the driver leaving the driver's seat) and/or gets into the vehicle 10 (as a result of the driver sitting in the driver's seat). As an alternative or in addition to the stopping (and/or starting) of the vehicle 10, output of the readout 11*a* is activated or deactivated as soon as the driver leaves the vehicle and/or gets into the vehicle 10.

Furthermore, the computing unit 13 comprises a graphics module, which is designed to output video data to the readout apparatus 11, in particular in order to graphically represent the readout 11*a* on and/or using the readout apparatus 11.

In one exemplary embodiment, the vehicle 10 comprises a communication apparatus 16, which is communicatively connected to the computing unit 13, and which is designed to interchange data with at least one remote apparatus 30.

The remote apparatus 30 may be formed for example by a control center and/or a cloud of a vehicle manufacturer and/or of a third-party provider, the remote apparatus transmitting parking information data about parking zones and/or parking time limits, which are received by the communication apparatus 16 of the vehicle 10 and/or may be forwarded from the communication apparatus 16 to the computing unit 13 for processing, in particular in order for the output of the readout 11*a* to be taken into consideration by and/or using the readout apparatus 11.

The parking information data may comprise for example a (legal) requirement for how the readout 11*a* is shown, in particular a size and/or a font and/or symbols of the readout 11*a*, and/or whether additional information, in particular a text box, is discernible on the readout 11*a*.

Furthermore, the parking information data may comprise a parking time limit for the parking zone P that the vehicle 10 is in.

The parking information data may alternatively or additionally be stored on a memory of the computing unit 13 and/or may be present thereon in stored form.

In one exemplary embodiment, the communication apparatus 16 is designed to convey a message to a user terminal 40. In particular, this allows a user of the user terminal, the user preferably being the driver or the vehicle keeper of the vehicle 10, to be notified of (imminent) expiry of the permitted parking period.

In one exemplary embodiment, the vehicle 10 comprises an input apparatus 17, which is designed to activate and/or deactivate output of the readout 11*a*. The input apparatus 17 may be operated for example by way of a switching element and/or by way of a voice input, preferably by the driver.

Figure 2:
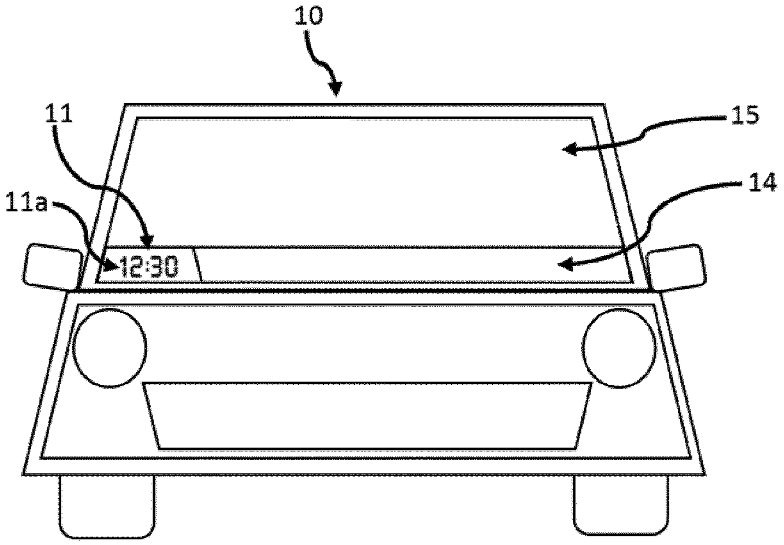
FIG. 2 is a schematic front view of a vehicle having a device for displaying an arrival time according to an embodiment of the invention.

FIG. 2 schematically shows a front view of an exemplary embodiment of a vehicle 10 having a device for displaying an arrival time.

The vehicle 10 comprises a windshield 15. Furthermore, the vehicle 10 comprises a dashboard 14. In one exemplary embodiment, the readout apparatus 11 is permanently installed in the dashboard 14 of the vehicle 10, in such a way that the readout 11*a* may be easily seen from outside the vehicle 10 through the windshield 15 and/or on the windshield 15.

In one exemplary embodiment, the readout 11*a* is arranged on a front-seat passenger's side of the vehicle 10, for example. In an alternative exemplary embodiment, the readout 11*a* is arranged on the driver's side.

In a concrete exemplary embodiment, the readout 11*a* may include for example a text box, preferably "arrival time:", and additionally a time readout and/or a graphical representation, the time readout corresponding to a time that signals the start of parking. Depending on (local) regulations, it may be a time statement that is rounded up from the current clock time to the nearest half-hour.

In one exemplary embodiment, the readout 11*a* may comprise a digital time readout, for example. In an alternative exemplary embodiment, the readout 11*a* may comprise a graphical representation of an analog time readout.

It will be pointed out at this juncture that all parts described above are claimed as essential to the invention on their own and in any combination, in particular of the details shown in the drawings.

LIST OF REFERENCE SIGNS

10 vehicle
11 readout apparatus
11*a* readout
12 detection apparatus
12*a* position determination module
12*b* acceleration sensor
13 computing unit
14 dashboard
15 windshield
16 communication apparatus
17 input apparatus
30 remote apparatus
40 user terminal
P parking zone or parking space

The invention claimed is:

1. A device for displaying arrival time of a vehicle, comprising:

at least one readout apparatus, which is configured to display a readout;

a detection apparatus, which is configured to detect that the vehicle is parked in a parking zone with a parking time limit and/or parking disc obligation, and to output a corresponding signal indicating that the vehicle is parked in the parking zone with the parking time limit and/or parking disc obligation; and a computing unit communicatively connected to the detection apparatus and the readout apparatus, wherein the computing unit is configured to control the readout apparatus to display the readout in response to the signal received from the detection apparatus, wherein the readout indicates an approximate time at which the vehicle is parked in the parking zone with the parking time limit and/or parking disc obligation.

2. The device according to claim 1, wherein the detection apparatus comprises a position determination module that determines a position of the vehicle, and wherein the readout is displayed based on the position of the vehicle.

3. The device according to claim 2, wherein the position determination module is a GPS module.

4. The device according to claim 1, wherein the detection apparatus comprises at least one acceleration sensor configured to detect that the vehicle is parked.

5. The device according to claim 1, further comprising: a communication apparatus communicatively connected to the computing unit, wherein the communication apparatus is configured to interchange data with at least one remote apparatus.

6. The device according to claim 5, wherein the communication apparatus and/or the computing unit is further configured to receive parking information data from the remote apparatus, the parking information data including information regarding the parking time limit and/or the parking disk obligation at the position of the vehicle, such that the readout is displayed based on the parking time limit and/or the parking disk obligation of the position of the vehicle.

7. The device according to claim 6, wherein the communication apparatus and/or the computing unit is further configured to wirelessly convey a warning to a user terminal about the parking time limit being reached.

8. The device according to claim 1, wherein the readout has a height of at least 2 cm.

9. The device according to claim 1, further comprising: an input apparatus for activating and/or deactivating output of the readout.

10. The device according to claim 1, wherein the readout apparatus comprises a display and/or a projector for showing the readout.

11. A motor vehicle, comprising:

a device for displaying arrival time of the vehicle according to claim 1, wherein the readout apparatus is arranged in a dashboard of the vehicle, and the readout apparatus is oriented in the dashboard such that the readout is visible outside the vehicle, on and/or through a windshield of the vehicle.

12. A method for displaying an arrival time of a vehicle, the method comprising:

detecting that the vehicle is parked in a parking zone with a parking time limit and/or parking disc obligation, via a detection apparatus of the vehicle comprising at least an acceleration sensor;

outputting a readout on a readout apparatus, which is arranged in a dashboard of the vehicle, the readout being visible outside the vehicle on and/or through a windshield of the vehicle, in response to detecting that the vehicle is parked in the parking zone with the parking time limit and/or parking disc obligation, wherein the readout indicates an approximate time at which the vehicle is parked in the parking zone with the parking time limit and/or parking disc obligation.

13. The method according to claim 12, further comprising:

receiving parking information data from a remote apparatus by way of a communication apparatus of the vehicle, the parking information data including information regarding a parking time limit and/or a parking disk obligation at the position of the vehicle; and adapting the readout on the readout apparatus in consideration of the parking time limit and/or the parking disk obligation of the position.

14. The method according to claim 13, further comprising: wirelessly conveying a warning about the parking time limit being reached to a user terminal by way of the communication apparatus of the vehicle.

15. The method according to claim 14, wherein the wireless conveyance of the warning to a user terminal takes place at least 15 minutes before the parking time limit is reached, and/or the wireless conveyance of the warning to a user terminal takes place on reception of a request signal, the request signal being sent to the communication apparatus of the vehicle by way of the user terminal.

16. A computer product comprising a non-transitory computer-readable medium having stored therein program code which, when executed by a computing unit, carries out:

detecting that the vehicle is parked in a parking zone with a parking time limit and/or parking disc obligation, via a detection apparatus of the vehicle comprising at least an acceleration sensor;

outputting a readout on a readout apparatus, which is arranged in a dashboard of the vehicle, the readout being visible outside the vehicle on and/or through a windshield of the vehicle, in response to detecting that the vehicle is parked in the parking zone with the parking time limit and/or parking disc obligation, wherein the readout indicates an approximate time at which the vehicle is parked in the parking zone with the parking time limit and/or parking disc obligation.

* * * * *